United States Patent [19]
Yates

[11] Patent Number: 5,866,955
[45] Date of Patent: Feb. 2, 1999

[54] MANUAL OVERRIDE DEVICE FOR AUTOMOBILES HAVING PHOTO ACTIVATED AUTOMATIC LIGHT SYSTEMS

[76] Inventor: Carroll H. Yates, 792 Mohawk Dr., Barboursville, W. Va. 25504

[21] Appl. No.: 773,876

[22] Filed: Dec. 27, 1996

[51] Int. Cl.⁶ ........................................ B60L 1/14
[52] U.S. Cl. ............................. 307/10.8; 315/83
[58] Field of Search ........................ 250/214 A, 237 R, 250/239, 229, 204, 205, 587.1, 515.1, 559.12, 221, 222.1; 362/802, 276, 61, 250; 307/9.1, 10.1, 10.8, 112, 116, 117, 118, 139, 140, 141, 141.4; 315/76, 77, 78, 82, 83, 80, 84; 701/1, 36, 49; 340/425.5, 457.2, 458, 469; 200/43.16, 43.22, 61.02; 361/600, 626

[56] References Cited

U.S. PATENT DOCUMENTS

| | | | |
|---|---|---|---|
| 2,476,382 | 7/1949 | Pillus | 315/82 |
| 2,927,245 | 3/1960 | Irland et al. | 315/83 |
| 2,938,143 | 5/1960 | Platzer, Jr. et al. | 315/83 |
| 3,121,798 | 2/1964 | Ploke | 250/229 |
| 3,354,320 | 11/1967 | Dryden | 250/237 R |
| 3,408,501 | 10/1968 | Thompson | 250/239 |
| 3,496,422 | 2/1970 | Horowitz | 250/239 |
| 3,580,157 | 5/1971 | Casebeer | 250/229 |
| 3,651,749 | 3/1972 | De Groot | 250/237 R |
| 4,971,405 | 11/1990 | Hwang | 315/83 |
| 5,347,261 | 9/1994 | Adell | 307/10.8 |
| 5,374,852 | 12/1994 | Parkes | 307/10.8 |
| 5,483,060 | 1/1996 | Sugiura et al. | 250/237 R |

Primary Examiner—Richard T. Elms
Attorney, Agent, or Firm—Robert N. Blackmon

[57] ABSTRACT

A device is provided for the manual override of atmospheric light activated headlight switches. The device is placed over a switch located on the dash board of an automobile. The device has a shutter which is movable between a first position wherein light is blocked from impinging on a photosensitive panel of the switch, and a second one wherein said panel is uncovered for permitting impingement of atmospheric light onto the panel. The device and related method permit the manual override of the switch to allow a driver to easily maintain the headlights and taillights in an on status.

9 Claims, 5 Drawing Sheets

MANUAL OVERRIDE DEVICE FOR AUTOMOBILES HAVING PHOTO ACTIVATED AUTOMATIC LIGHT SYSTEMS

BACKGROUND OF THE INVENTION

1. Field of the Invention

The present invention relates to photo activated automatic light systems for automobiles and automobiles having such systems, and more particularly relates to control systems for photo activated automatic light systems for automobiles and automobiles having such systems.

2. Description of the Related Art

Various systems have been developed for automatically turning on headlights and taillights when atmospheric conditions darken and then turning off such headlights and taillights when atmospheric conditions lighten. Such systems typically utilize a photovoltaic cell on the dashboard in the interior of the automobile adjacent the windshield to act as a switch dependent upon the amount of light striking the cell surface. These prior systems also typically utilize a time delay mechanism in order to not turn the lights on or off whenever the dark or light conditions are merely temporary. Manually turning on the lights during daylight can result in annoying warning bells activating during opening of the car door and/or can result in undesired battery drainage if the lights are left on after the engine has been turned off. Some drivers desire that their headlights and taillights be on during day and night conditions, but also desire that the headlights and taillights automatically turn off within a reasonable time after the engine has been turned off.

Consequently, there is a need and a desire to solve these problems and improve conventional photo activated automatic light systems.

SUMMARY OF THE INVENTION

The present invention involves a photo activated light system having a manual override device and an automobile having such a system. The system has a headlight, a tail light, an electric power source for providing power to the lights, a photovoltaic switch for activating the lights in response to a dark atmospheric condition and for turning the lights off in response to a relatively bright atmospheric condition, and a manual override device positioned over the switch for selectively permitting or preventing atmospheric light impingement on the surface of photo activated panel of the switch. The device may be easily attached to an automobile dash over a photo voltaic cell panel by use of an adhesive layer on the device.

DETAILED DESCRIPTION OF THE INVENTION

Figure 1:
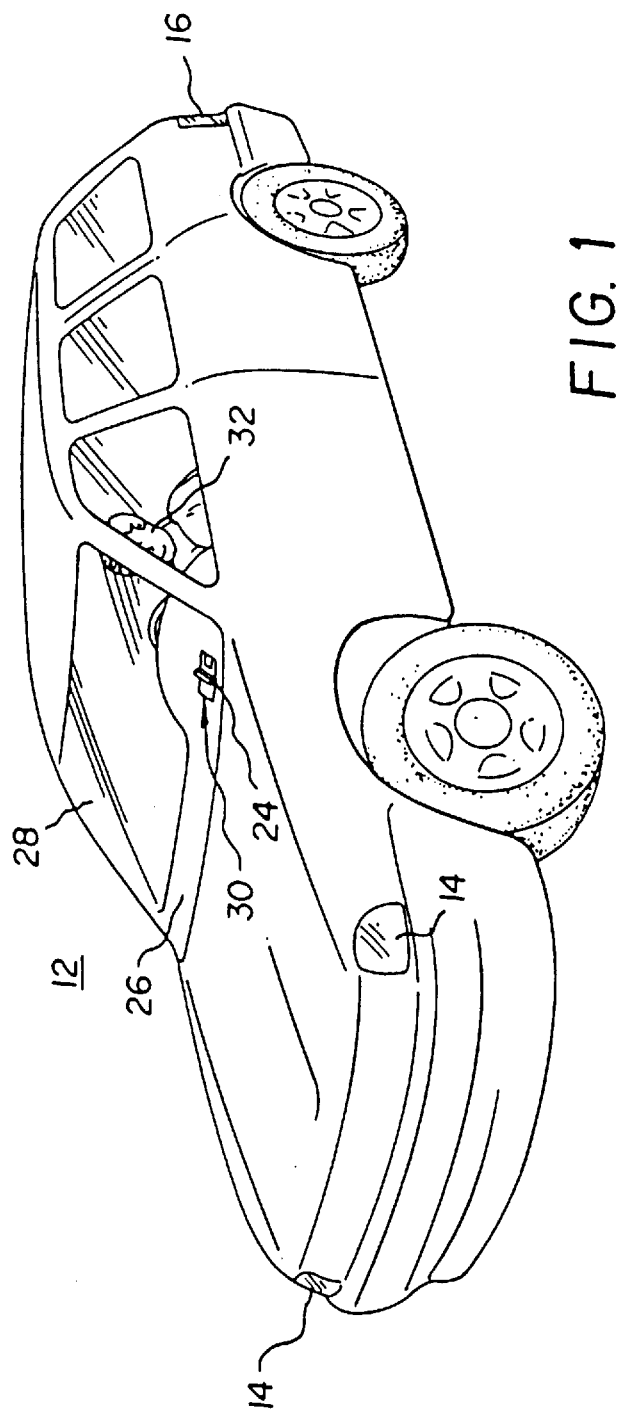
FIG. 1 is a perspective view of an automobile having the system of the present invention.
Figure 2:
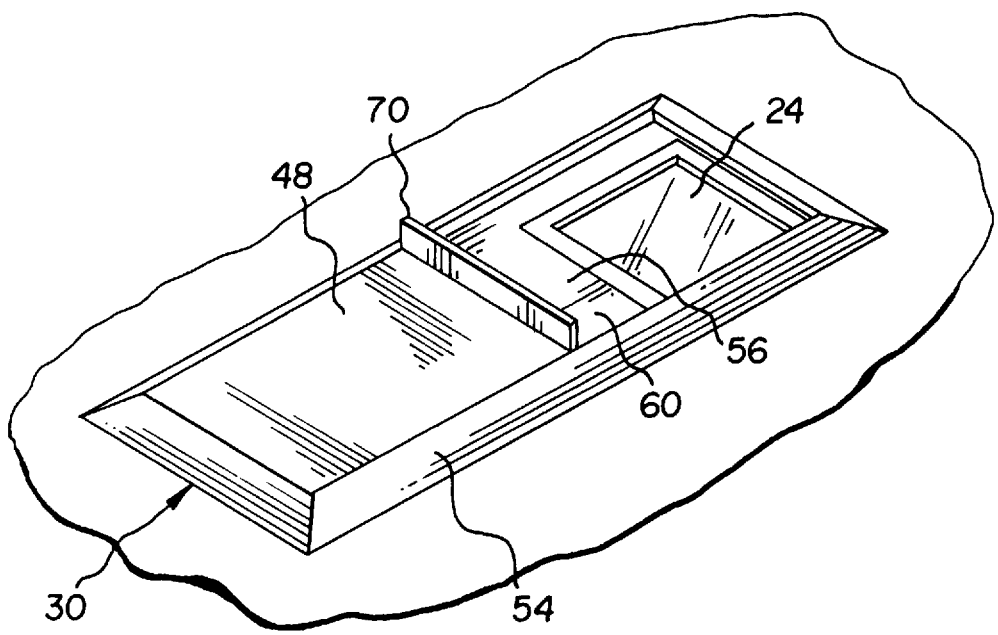
FIG. 2 is a cutaway perspective view of an automobile dash having the system of FIG. 1.
Figure 3:
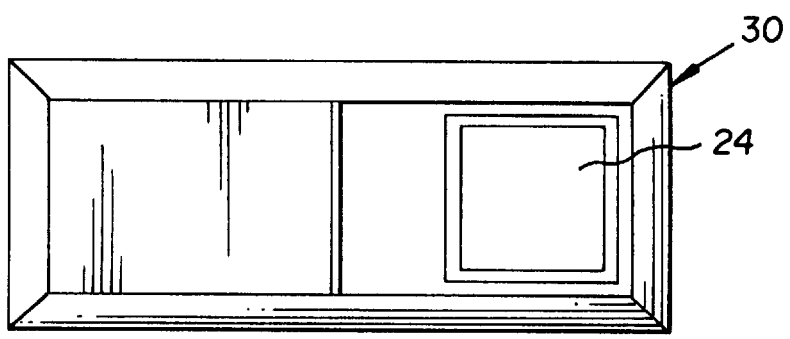
FIG. 3 is a top plan view of a manual override device according to the present invention.
Figure 4:
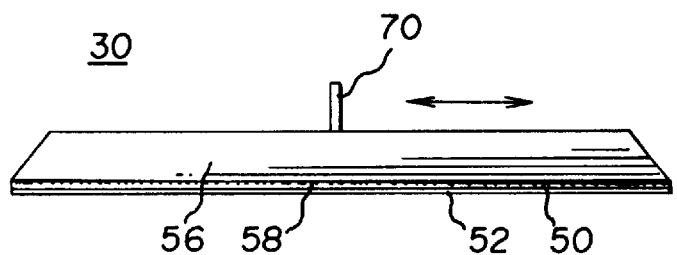
FIG. 4 is a side elevational view of the manual override device.
Figure 5:
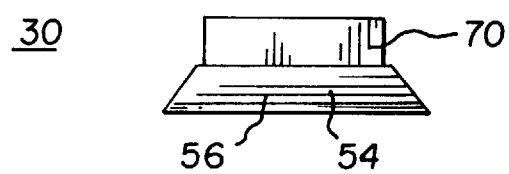
FIG. 5 is a end elevational view of the manual override device.
Figure 6:
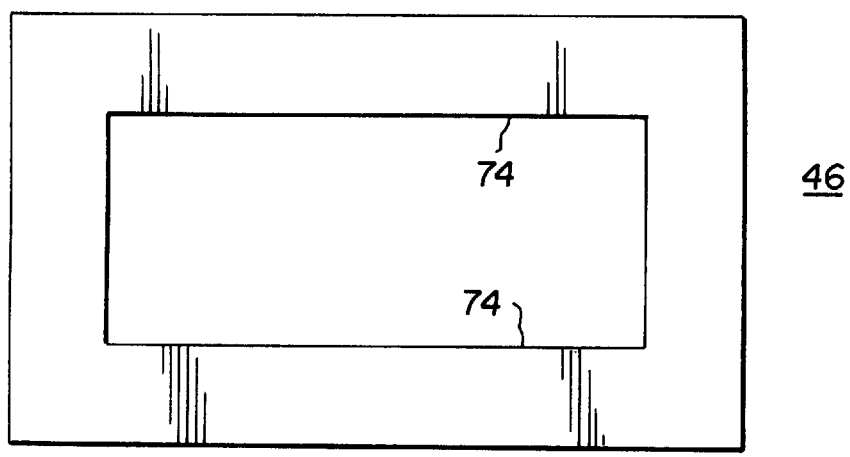
FIG. 6 is a top plan view of a top layer of the device of FIG. 1.
Figure 7:
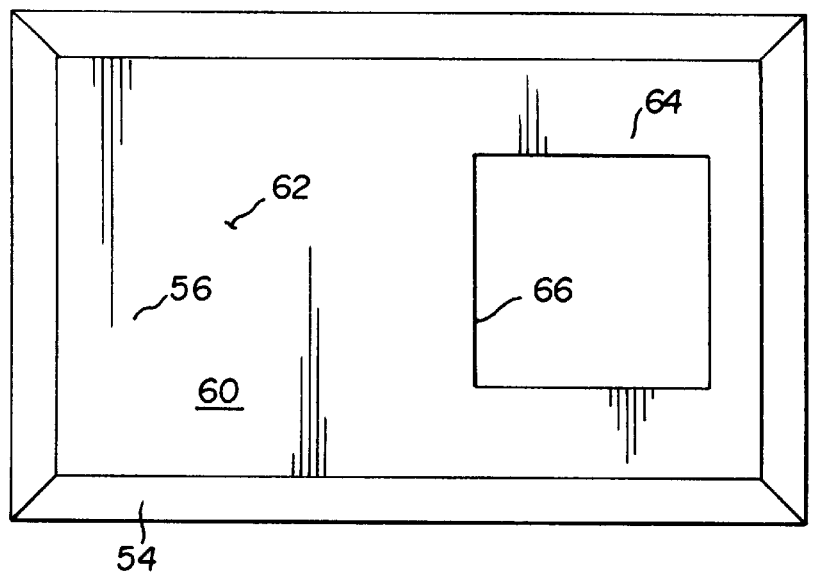
FIG. 7 is a top plan view of a bottom layer of the device of FIG. 1.
Figure 8:
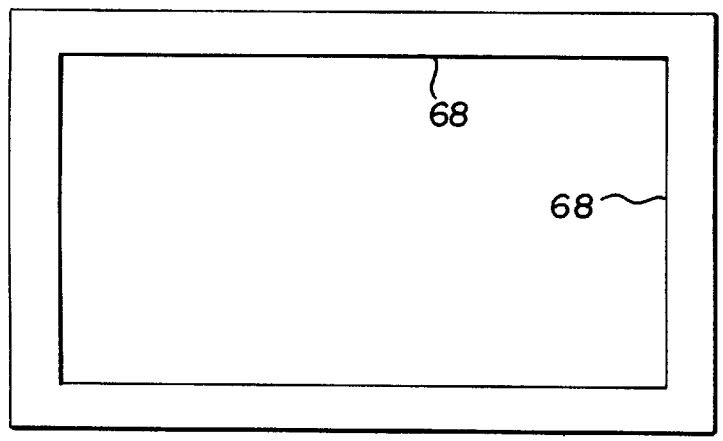
FIG. 8 is a top plan view of a spacer layer of the device of FIG. 1.
Figure 9:
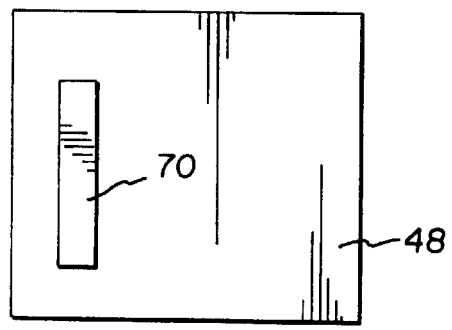
FIG. 9 is a top plan view of a shutter element of the device of FIG. 1.
Figure 10:
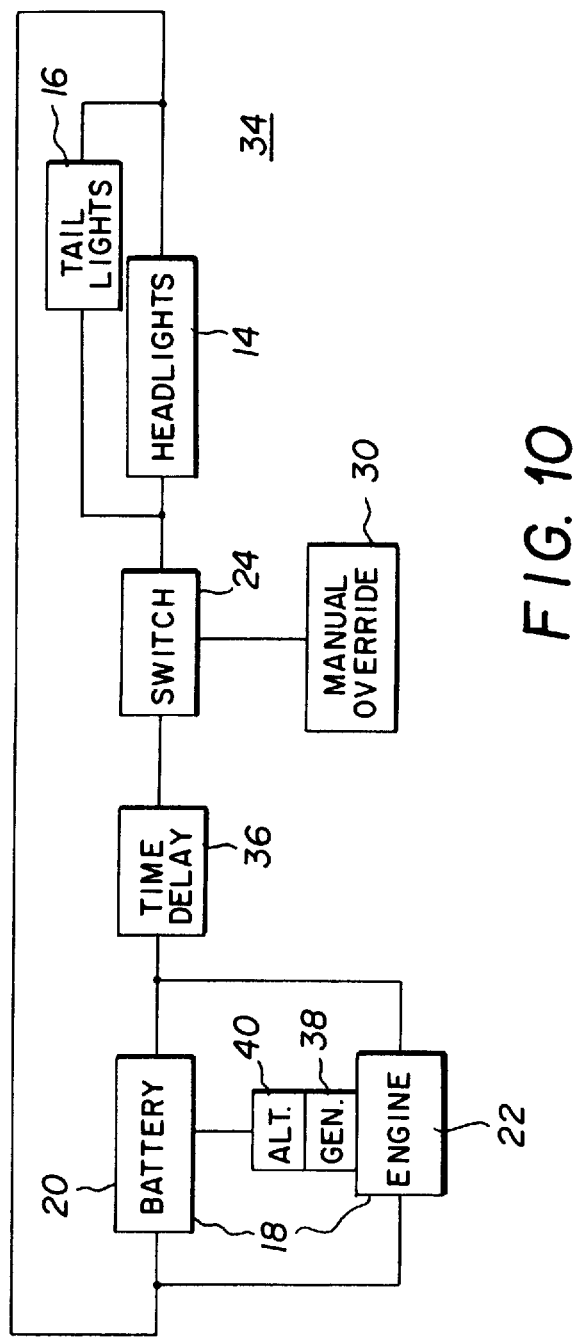
FIG. 10 is a schematic of a system having a device according to the present invention.

As best shown in FIG. 1, an automobile (12) has a pair of spaced apart headlights (14) on the front of the automobile (12) and has a pair of spaced apart tail lights (16). As best shown in FIG. 10, the automobile (12) has a power source (18) for providing electrical power to the lights (14, 16). The power source (18) may be a combination of a battery (20) (12 volt car battery) and a hydrocarbon fueled internal combustion engine (22) having conventional means for converting mechanical power into electrical energy. The automobile (12) has a photoelectric switch (panel) (24) for responding to atmospheric light levels to either turn the lights (14, 16) on or off depending upon the level (amount) of light rays impinging upon the switch (24). The automobile (12) has a dash board (26) wherein the switch (24) is located, and the switch (24) is positioned below a windshield (28) so that light passing through the windshield (28) will impact the surface of the switch (24).

A manual override device (30) is positioned over the switch (24) to permit the automobile operator (32) to manually control (selectively) the ability of atmospheric light to impinge upon the switch (24).

Consequently, as best shown in FIG. 10, a system (34) is provided having lights (14, 16), a photo sensitive switch (24), a manual override device (30), optionally a time delay element (36), and a power source (18) (such as a combination of a battery (20) and a hydrocarbon powered engine (22)/generator (38)/alternator (40)).

As shown in FIGS. 2, 3, 4, 5, 6, 7, 8 and 9, the manual override device (30) preferably has a bottom layer (42), a spacer layer (44), a top layer (46), a shutter (48) and an adhesive layer (50). Prior to placement on the dash (26) over the switch (24), the device (30) has a removable cover layer (52) which overlays the adhesive layer (50) for preventing unintentional contact of the adhesive layer (50) with the environmental surroundings prior to adherence to the dash (26).

The bottom layer (42) may have an upwardly and inwardly slanted cover edge (54) and a base plate (56). The cover edge (54) surrounds the base plate (56) and extends from the bottom (58) of the base plate (56) upward beyond the top surface (60). The base plate (56) is preferably rectangular in shape having a solid first section (62) and having a second section (64) having a light pass-through port (66). The port (66) is preferably rectangular and preferably is the size of at least the area of the switch panel(24). Preferably the port (66) has an area of at least 1 square inch, and more preferably is a square shape having 1.25 inches by 1.25 inches as the dimensions thereof. Preferably the base plate (56) is rectangular in shape having a dimension of 3.75 inches by 2.25 inches. The spacer layer (44) preferably has the same outer perimeter shape and dimensions as that of the base plate (56) and is positioned over the base plate (56) and within the cover edge (54) (being encompassed about its perimeter by the cover edge (54)). The spacer layer (44) has an open interior which functions as a slide channel (68). The shutter (48) is preferably rectangular (square) in shape and fits within the slide channel (68) for sliding therein between a first position wherein the port (66) is covered by the shutter (48) and a second position wherein the port (66) is uncovered for transmission of light therethrough into contact with the panel (24). The shutter has a handle (70) for permitting easy manual engagement of the shutter (48) for forcing movement between the covered and uncovered positions. The handle (70) extends upwardly from and is attached to a shutter plate.

The top layer (46) has a handle slot (74) which is narrower than the port (66) for trapping (maintaining the position of) the shutter (48) between the top layer (46) and the bottom layer (42) within the spacer layer (44). The handle slot (74) is wide enough to permit the handle to extend therethrough for permitting the handle (70) to move within the slot (74) during movement of the shutter (48) within the channel (68), and is narrow enough to retain the shutter (48) between the top layer (46) and the bottom layer (42). The handle (70) is narrower than the channel (68). The manual override device (30) is useful for an automobile (12) having a photo activated light switch (24) located on a dash board (26) of the automobile (12). The device (30) comprises a selection means for selectively covering and uncovering the light switch (24). The selection means has a shutter (48) for movement between a first position wherein the switch (24) is covered and a second position wherein the switch (24) is uncovered. The device also preferably comprises an adhesive means attached to the selection means for adhering the selection means to the dash board (26). The selection means preferably comprises a bottom layer (42), a spacer layer (44) adhered to the bottom layer (42), a top layer (46) adhered to the spacer layer (44). The selection means has a slide channel (68) for permitting linear movement of the shutter (48) therein. The bottom layer (42) has a rectangular pass-through port (66) for permitting light to pass through the device (30) to impinge upon the switch (24) when the shutter (48) is in the second position.

The automobile preferably comprises a dash (26), headlights (14), and a photo activated switch (24) for automatically turning the headlights (14) on and off in response to atmospheric light conditions. The switch (24) is located on the dash (26). The automobile also has a power source (18) for providing power to the headlights (14), and selection means for selectively covering and uncovering the light switch (24). The selection means has a shutter (48) for movement between a first position wherein the switch (24) is covered and a second position wherein switch (24) is uncovered. The selection means is located on the dash (26) and is positioned above the switch (24). Preferably, the selection means is adhesively attached to the dash (26).

The present invention further involves a method for selectively overriding photo activated switch controls of an automobile wherein the switch has a photosensitive panel located on a dash board of the automobile. The method preferably involves: (a) a placing device (30) over the panel (24), the device (30) having an adhesive layer (50), the adhesive layer (50) adhering to the dash board (26), the device (30) having a movable shutter (48) for movement between a first position covering the panel (24) and a second position uncovering the panel (24), (b) moving the shutter (48) to the first position to cover the panel (24) to permit the switch (24) to respond to atmospheric light, (c) moving the shutter (48) to the second position to uncover the panel (24) to be unresponsive to atmospheric light. The shutter (48) is movable between the first and second positions by manually sliding the shutter within the channel (68) in the device (30).

EXAMPLE

A device was made and tested, and it functioned as desired. The device had a top layer, a spacer layer, a bottom layer and a shutter. The bottom layer did not have a surrounding over edge, so each of the individual layers were visible in the device that was made. The bottom layer had a rectangular shape and was 2.25 inches by 3.75 inches and has a right side light transmission port which is square in shape and has a dimension of 1.25 inches by 1.25 inches. The bottom layer had a thickness of 0.125 inch. A spacer layer was overlaid onto the bottom layer and was adhered thereto. The spacer layer had an outer dimension of 2.25 inches by 3.75 inches, and had an internal slide channel had dimensions of 2 inches by 3.25 inches, providing an outer frame having a width of 0.25 inches. The spacer layer had a thickness of 0.125 inches. A shutter was placed within the channel for sliding therein. The shutter had the dimensions of 1.875 inches by 1.9375 inches by 0.125 inches. A top layer was placed over the spacer layer and adhered thereto. The shutter had a handle having dimensions of approximately 0.5 inches in height, 1.0 inches in width and a depth of 0.25 inches and was attached to the shutter plate and extended upward therefrom. The shutter plate was slightly less than the thickness of the spacer to permit sliding movement of the shutter plate within the spacer channel.

What is claimed is:

1. A manual override device for an automobile having a photo activated light switch located on a dash board of the automobile, said device comprising:

(a) selection means for selectively covering and uncovering said light switch, said selection means having a shutter for movement between a first position wherein said switch is covered and a second position wherein said switch is uncovered, and (b) adhesive means attached to said selection means for adhering said selection means to said dash board.

2. The device of claim 1 wherein said selection means comprises a bottom layer, a spacer layer adhered to said bottom layer, a top layer adhered to said spacer layer, said selection means having a slide channel for permitting said movement of said shutter.

3. The device of claim 2 wherein said shutter has a handle means for moving said shutter between said first position and said second position.

4. The device of claim 2 wherein said bottom layer has a rectangular pass through port for permitting light to pass through the device to impinge upon the switch when said shutter is in said second position.

5. An automobile having a dash, said automobile comprising:

(a) headlights, (b) a photo activated switch for automatically turning the headlights on and off in response to atmospheric light conditions, said switch being located on said dash, (c) a power source for providing power to said headlights, (d) manual selection means for selectively covering and uncovering said switch, said selection means having a shutter for movement between a first position wherein said switch is covered and a second position wherein said switch is uncovered, said selection means being located on said dash and being positioned above said switch.

6. The automobile of claim 5 wherein said selection means is adhesively attached to said dash.

7. The automobile of claim 5 wherein said selection means comprises a bottom layer, a spacer layer adhered to said bottom layer, a top layer adhered to said spacer layer, said selection means having a slide channel for permitting said movement of said shutter.

8. A method for selectively overriding photo activated switch controls of an automobile, said switch having a photosensitive panel, said panel being located on a dash board of said automobile, said method comprising:

(a) placing a device over said panel, said device having an adhesive layer, said adhesive layer adhering to said dash board, said device having a movable shutter for movement between a first position covering said panel and a second position uncovering said panel, (b) moving said shutter to said first position to cover said panel to permit said switch to respond to atmospheric light, (c) moving said shutter to said second position to uncover said panel to be unresponsive to atmospheric light.

9. The method of claim 8 wherein said shutter is movable between said first and second positions by manually sliding said shutter within a channel in said device.

* * * * *